UNITED STATES PATENT OFFICE.

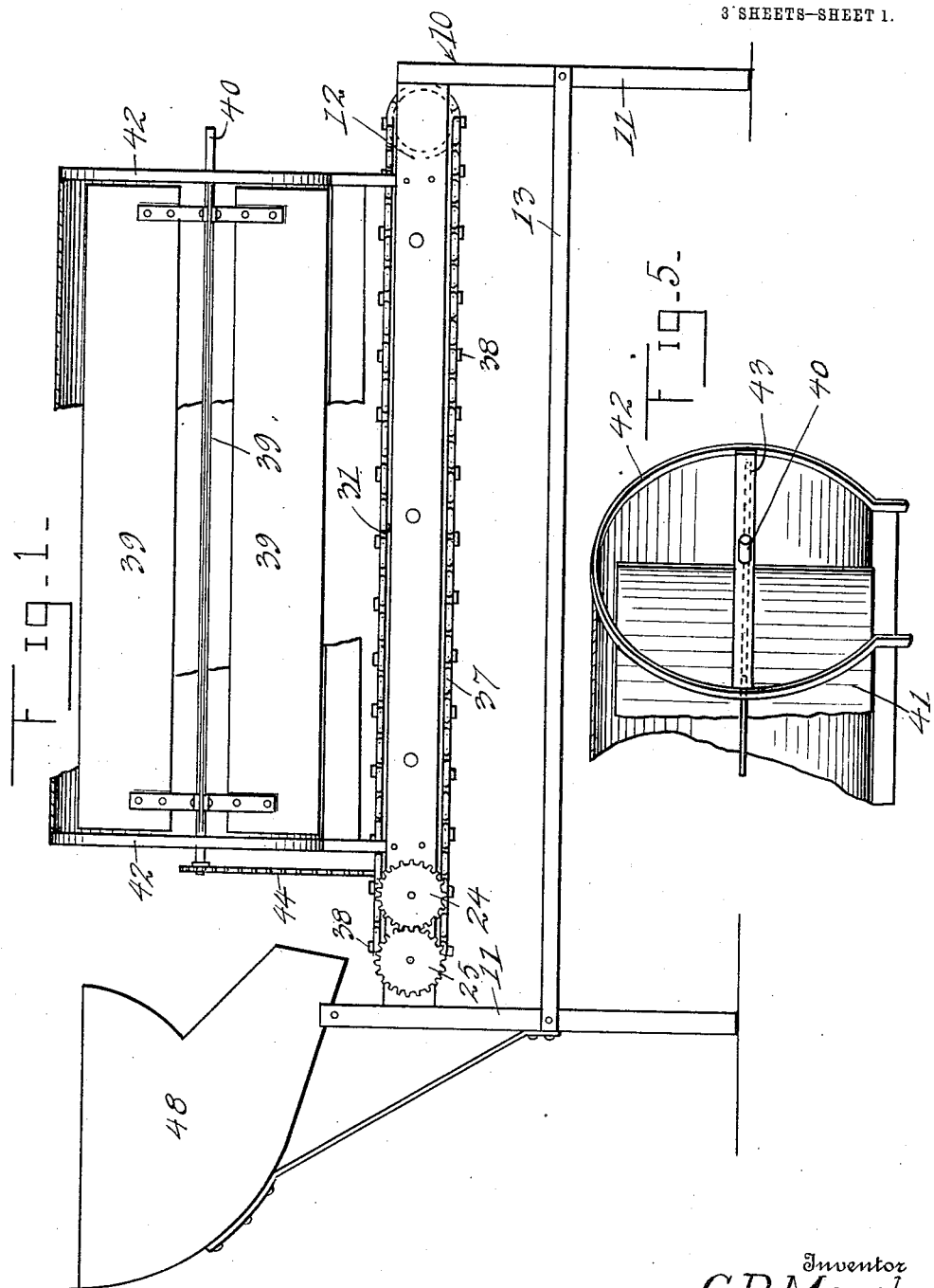

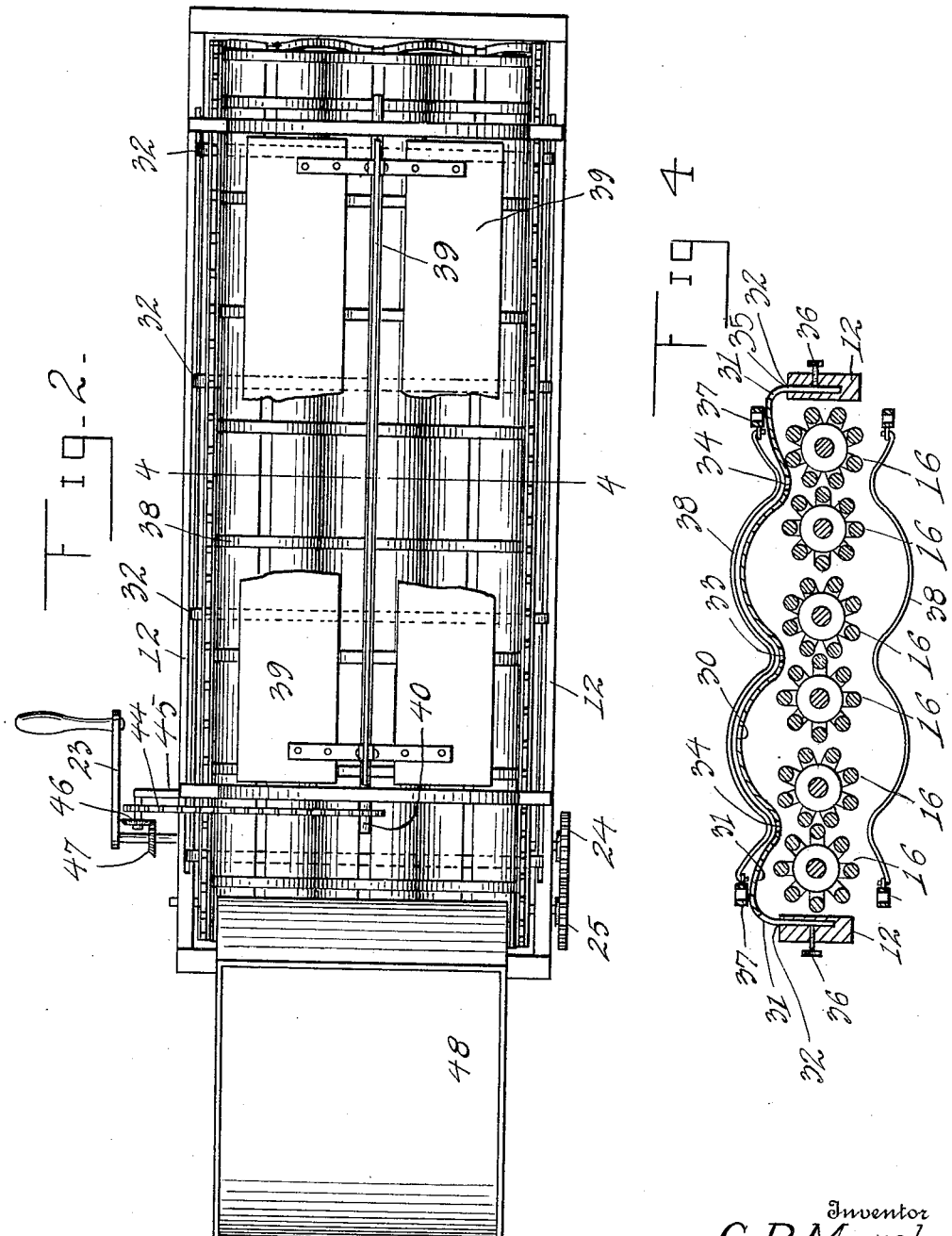

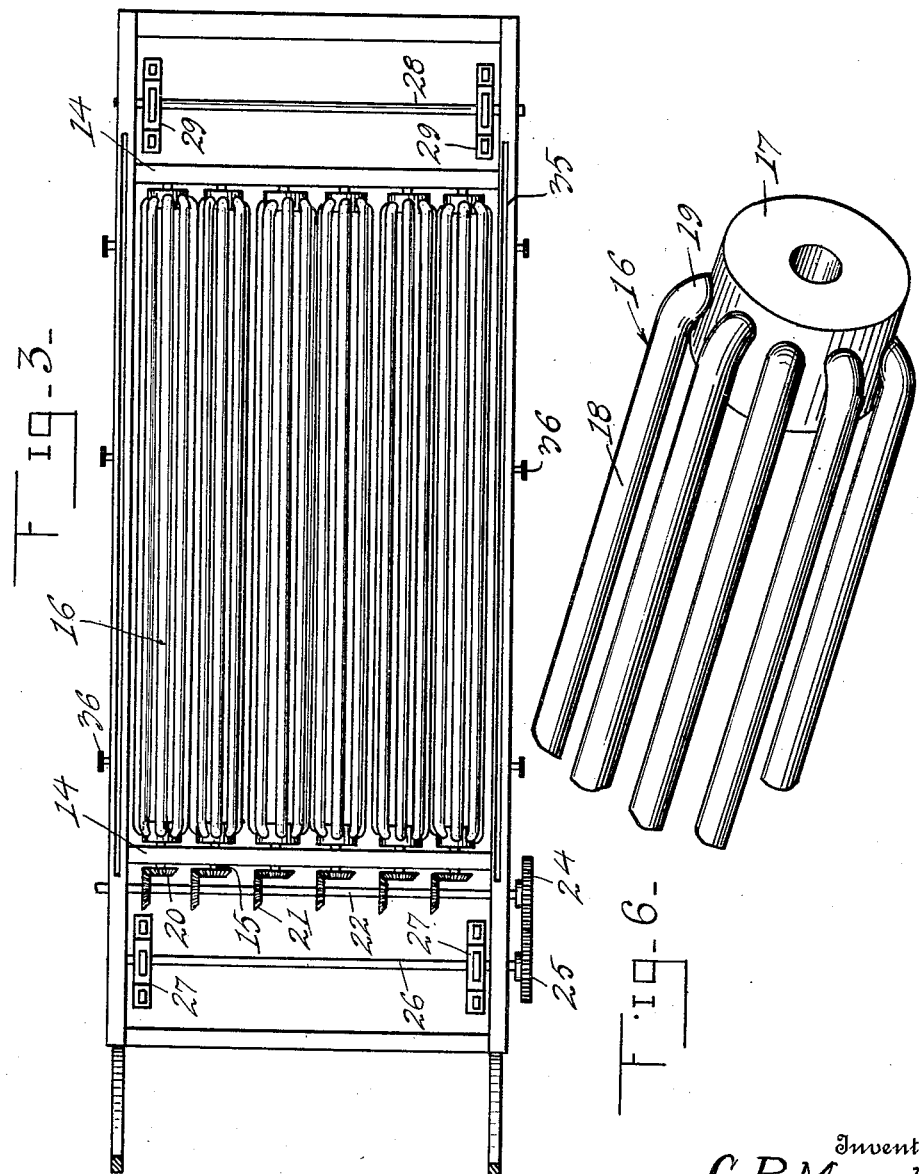

CHARLES P. MARSH, OF BLUE EARTH, MINNESOTA, ASSIGNOR OF ONE-HALF TO DELOS F. POND, OF BLUE EARTH, MINNESOTA.

ONION-TOPPING MACHINE.

1,085,053.	Specification of Letters Patent.	Patented Jan. 20, 1914.

Application filed March 18, 1913. Serial No. 755,230.

*To all whom it may concern:*

Be it known that I, CHARLES P. MARSH, a citizen of the United States, residing at Blue Earth, in the county of Faribault and State of Minnesota, have invented certain new and useful Improvements in Onion-Topping Machines; and I do hereby declare the following to be a full, clear, and exact description of the invention, such as will enable others skilled in the art to which it appertains to make and use the same.

This invention comprehends improvements in vegetable toppers and relates more particularly to onion topping machines.

The primary object of the invention resides in the provision of a machine of this nature in which the tops are severed from the bulbs by intermeshing rollers without any contact between said bulbs and rollers.

Another object of the invention resides in the provision of a machine of this nature including a number of pairs of barred rollers, a longitudinally slotted platform positioned over said rollers, a conveyer adapted to move the onions along the platform, and a fan which will create a draft to force the onion tops between the slots of the platform into engagement with the revolving rollers.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a side elevation of an onion topping machine constructed in accordance with my invention, Fig. 2 is a top plan view thereof, the fan blades being broken away, Fig. 3 is a top plan view of the frame and rollers with means for actuating the same, Fig. 4 is a transverse sectional view taken on the plane of line 4—4 of Fig. 2, Fig. 5 is a fragmentary perspective view of one end of the fan and casing therefor, and, Fig. 6 is a similar view of a portion of one of the topping rollers.

In the following description and accompanying drawings similar parts will be referred to and designated by like reference characters.

Referring in detail to the drawings by numerals, 10 designates, generally, a frame comprising four uprights 11, side bars 12, and braces 13. Bearing plates or bars 14 extend transversely of the frame and are secured to the side bars adjacent the ends of the frame. A plurality of shafts 15 are journaled through the bearing bars and have rigidly secured thereon the topping rollers, generally designated 16. Each of these rollers comprises two hubs 17 through which shafts pass a plurality of bars 18 which are connected at their ends to these hubs. As clearly shown in Fig. 6, the bars extend in parallel relationship to one another, are spaced a slight distance apart, and are offset from the hubs by having their ends inturned, as indicated at 19.

Upon reference to Figs. 3 and 4, it will be noted that the rollers are arranged in pairs and that the bars of each pair intermesh when the rollers are revolving.

Beveled gears 20 are rigid with the forward ends of the shafts 15 and mesh with similar gears 21 rigid upon the shaft 22, which is journaled through the side bars 12. This last mentioned shaft may be rotated in any desired manner, such as by means of a crank handle 23. A spur gear 24 is fixed to the shaft 22 and meshes with a similar gear 25 rigid with the shaft 26 to which are fixed the sprocket wheels 27. A shaft 28 at the other end of the frame 10 has rigid with it the sprocket wheels 29, which act in conjunction with the first mentioned sprocket wheels to actuate a conveyer, the construction of which will be hereinafter explained.

A platform is positioned over the topping rollers and is adapted to support the onions away from contact with the same while their tops are being removed. This platform is formed of four longitudinally extending sections 30 and 31, connected by suitable straps 32. The inner sections 30 are concavo-convex in cross section, have their convex surfaces uppermost, and have their opposed edges spaced apart to form the slot 33. The outermost sections 31 have their upper convex surfaces inclined toward the outermost edges of the sections, as is clearly shown in Fig. 4. The sections 31 are spaced from the sections 30, so as to leave the slots or openings 34. The outer edges of the sections 31 are received within longitudinal grooves 35 formed in the frame bars 12 and suitable fasteners 36 may be employed to secure said edges therein. Upon reference to Fig. 4, it will be seen that the slots in the platform are directly in alinement with the intermeshing portions of the rollers and that the platform may be adjusted vertically with respect to these rollers.

An endless conveyer comprising a pair of sprocket chains 37 which run over the sprocket wheels 27 and 29 and a plurality of slats 38 which are connected at their ends to these chains is adapted to feed the onions along the platform. As shown in Fig. 4, the slats 38 are curved to conform to the wavy surface of the platform.

To force the tops of the onions through the slots in the platform into engagement with the topping rollers, I provide a fan 39 fixed to a shaft 40. A fan casing 41 open at each end and at its bottom is secured to the frame 10 by means of the open hoops 42 and the braces 43, which extend across said hoops, to form bearings for the fan shaft 40. The fan may be driven by means of a chain 44 which runs over gears upon the fan shaft and the arm 45. The gear upon the arm 45 is driven by a bevel gear 46 which meshes with a similar gear 47 rigid with the shaft 22.

A hopper 48 or other suitable feeding means is secured to the forward end of the frame and discharges the onions which are to be topped, upon the forward end of the platform. When the crank 23 is turned the rollers are revolved, the conveyer set in motion, and the fan driven. The conveyer draws the onions slowly over the platform; the fan creates a draft which blows the onion tops through the slots in the platform; and the rollers, which intermesh directly under said slots, sever the tops from the bulbs.

It is to be particularly noted that the platform holds the onions away from contact with the rollers and thereby prevents them becoming crushed or injured in any manner. Since the platform is adjustable with respect to the rollers, the machine may be made to top either short or long. The structure of the platform is such as to direct the vegetables into the valleys formed between the sections and the slots 33 and 34 are sufficiently wide to permit the tops being easily forced therethrough but not permitting the bulbs to pass. The draft created by the fan while sufficient to force the onion tops from the slots in the platform, does not in any way injure the vegetables.

It will be seen from the foregoing description taken in connection with the accompanying drawings, that I have designed a very compact and efficient onion, or similar vegetable topping machine, which performs its work without in any manner injuring the vegetables, which is rapid in operation, and which may be intergeared so that the various movable parts may be simultaneously actuated. I have found that the barred intermeshing rollers are much more efficient and make a cleaner cut than the grooved rollers now in common use.

It is to be understood that while I have shown and described the preferred embodiment of my invention, I do not wish to be limited to this exact construction, combination, and arrangement of parts, but may make such changes as will fall within the spirit and scope of the invention.

Having thus described my invention, what I claim is:—

1. An onion topping machine comprising a frame, a plurality of barred intermeshing rollers journaled in said frame, a slotted platform positioned over the rollers, a conveyer movable over said platform in engagement therewith, means independent of the conveyer for forcing the onion tops through said slots into engagement with the rollers, and means for driving said movable parts.

2. An onion topping machine comprising a frame, a plurality of barred intermeshing rollers journaled in said frame, a slotted platform positioned over the rollers, a conveyer movable over said platform in engagement therewith, a fan housed above said conveyer and platform, whereby the onion tops are forced through the slots into engagement with the rollers, and means for actuating the aforementioned movable parts.

3. In an onion topping machine, the combination of a frame, a plurality of barred rollers journaled in said frame and arranged in intermeshing pairs, a platform extending over said rollers, said platform being slotted over the intermeshing portion of each pair of rollers, means for conveying the onions along said platform, and means for forcing their tops through the slots into engagement with the revolving rollers.

4. A topping roller comprising a pair of hubs, and a plurality of bars connected at their ends to said hubs, the bars being spaced from one another, arranged in parallel relationship, and offset from the peripheries of the hubs.

5. In a machine of the character described, the combination of a frame having longitudinally grooved side bars, a vegetable supporting platform having its edges projecting into said grooves, means for holding the projected edges in any adjusted positions within the grooves, the platform being formed of a plurality of longitudinal sections having their opposed edges spaced from one another to provide openings through which the tops of the vegetables are adapted to pass, means for forcing said tops through the openings, and means for severing the tops after having been forced therethrough.

6. In an onion topping machine of the character described, the combination of a horizontal frame, a plurality of barred rollers journaled within said frame, said rollers being arranged in intermeshing pairs, a platform secured to the frame and extending over the rollers, said platform being vertically adjustable and formed with longitudinal slots directly above the intermeshing portions of each pair of rollers, means for conveying vegetables along said platform, and pneumatic means for forcing the tops of the vegetables through said slots into engagement with the intermeshing rollers.

In testimony whereof I affix my signature in presence of two witnesses.

CHARLES P. MARSH.

Witnesses:
F. J. SPENCER,
O. FREUND.

Copies of this patent may be obtained for five cents each, by addressing the "Commissioner of Patents, Washington, D. C."